July 13, 1926. Re. 16,382

S. W. RUSHMORE

RADIATOR FOR COOLING FLUIDS

Original Filed Dec. 6, 1921 3 Sheets-Sheet 1

Inventor
Samuel W. Rushmore
By his Attorney
Geo. H. Allen

July 13, 1926. Re. 16,382

S. W. RUSHMORE

RADIATOR FOR COOLING FLUIDS

Original Filed Dec. 6, 1921 3 Sheets-Sheet 2

Inventor
Samuel W. Rushmore
By his Attorney
George A. Olcan

July 13, 1926. Re. 16,382

S. W. RUSHMORE

RADIATOR FOR COOLING FLUIDS

Original Filed Dec. 6. 1921 3 Sheets-Sheet 3

Inventor
Samuel W. Rushmore
By his Attorney
George C. Ellison

Reissued July 13, 1926. Re. 16,382

UNITED STATES PATENT OFFICE.

SAMUEL W. BUSHMORE, OF PLAINFIELD, NEW JERSEY.

RADIATOR FOR COOLING FLUIDS.

Original No. 1,455,739, dated May 15, 1923, Serial No. 520,210, filed December 6, 1921. Application for reissue filed May 6, 1925. Serial No. 28,516.

My present invention relates to radiators, particularly radiators for use with cooling systems of the type which operate by the boiling and condensing cycle for the cooling of automotive engines.

In the system described in my Patent No. 1,378,724, granted May 17, 1921, the water and steam from the engine jacket is discharged into a separating chamber in the bottom of the radiator, the water being returned to the engine jacket and the steam rising into the air-cooled passages of the radiator, so that the radiator operates as an up-flow condenser, the condensate returning by gravity against the upward flow of steam.

In said patent this method is referred to as applicable to radiators of the types which are now employed as standard equipment on automobiles, trucks, etc., but such radiators are primarily designed for cooling of water instead of steam, by down-flow instead of up-flow, and I have discovered that in the practical operation of such radiators by the "steam cooling" system, the potential cooling capacity is not fully utilized.

The primary difficulty is that the fan which draws the cooling air through the radiator, induces a much heavier blast in the central portions of the condensing area than at the sides. Consequently the central portions are capable of radiating much more heat and condensing much more steam per unit of cooling surface, than are the sides. But the side passages which are least cool are designed to have the same or less, flow resistance than the central portions, with the result that where the relatively frictionless, massless steam is substituted for water, the balance between the several up and down passages, as regards flow capacity and condensation capacity, is completely upset.

Careful experiment shows that long before the total volume of steam to be condensed becomes great enough to tax the cooling capacity of the radiator as a whole, the inferior cooling capacity at the sides will be over-taxes. The heat therefore creeps higher up, heating the side portions; the air becomes lighter so that the hot air and steam rise up into the empty space at the top of the radiator displacing the colder air downward (because the colder air is heavier and because air, even at 212° F., is about 60% heavier than steam); but the same or even greater volume of steam flowing directly up into the better-cooled central portions is condensed long before it reaches the top, the passages and air above it being kept cold by the fan. The up-flowing steam can push the air upward only the limited height to which such steam rises before being condensed.

As a result there remains in the central portion of the radiator a body of air which is supported from below by up-flowing steam and sealed in above by steam rising from the sides. Reverse curl or eddying of such steam from the sides may serve to scavenge out more or less of the air in the relatively open space above the honeycomb, but has practically no effect on the air trapped and kept cold in the narrow central passages of the radiator. Hence the air thus trapped stays trapped, practically excluding the steam which might otherwise flow in from both top and bottom.

While this objectionable action may be more readily analyzed and understood in connection with radiators of the type in which the steam passages are parallel vertical conduits having no cross flow connections except at top and bottom, nevertheless, the same action is found to occur to an undesirable extent in radiators of the type in which the honeycomb is built up from a multiplicity of short horizontal tubes forming an interconnected net-work of passages and cross-connections.

In its broadest aspects, my invention includes proportioning and arranging the steam condensing passages with reference to the different portions of the area of the radiator so that the steam will flow through all of the condenser passages at rates which will insure driving the contained air to a point suitable for its collection and discharge instead of trapping it.

The preferred point for collection and discharge of the air is the upper space in the radiator above the top of the condensing passages. To drive it there I arrange matters so that steam will not reach the well cooled central portions of the radiator except from below. There are many factors, one or more of which may be varied separately or together to bring about this result.

The up-flow paths at the sides may have their flow capacity decreased. This may be accomplished by making them longer, or of smaller cross-section, or arranging them so that the flowing steam will be checked by a succession of high-angled impacts, all of which factors are utilized in the device of my prior application, Serial Number 500,382 filed September 13, 1921, patented May 15, 1923, No. 1,455,737. The decrease of flow section and the obstruction by impact may be distributed from bottom to top of the side passages as in said application, or may be localized at desired points.

For radiators of the type in which the radiating elements consists of vertical tubes arranged to afford separate parallel paths for flow of the steam, a similar result may be accomplished by having an obstruction, preferably at the upper ends of the side tubes, thereby increasing the flow resistance at said upper ends.

The obstruction may be any desired form of local constriction, preferably a closure with a vent through it. The vent may be very small, because proper functioning requires only an extremely small flow capacity at this point, merely sufficient to permit slow in and out "breathing" in response to variations of height to which the steam has to rise in the tubes before it is condensed. A vent sufficiently large for this purpose, may yet be small enough to afford relatively enormous throttling resistance to outrush of steam in quantities such as would cause down-flow in the central tubes.

Where the tubes are large, say ½ to ⅝ inch in internal diameter, it may prove convenient to have a separate vented closure in the upper end of each side tube, but, if desired, a single closure may be fitted over the ends of several adjacent tubes, in which case a single vent is used for each closure. Thus the vent may be proportionally larger for a given resistance. Such group arrangement is particularly desirable where the tubes are of such small diameter that control of each by a separate vent would require a vent so small that it would be in danger of getting clogged.

The size of the vent is preferably such that the volume of steam escaping from the tops of the side tubes will be kept well below the condensing capacity of the top space, until and except when the steam evolution in the base of the radiator becomes great enough to bring the steam to the tops of the best cooled central tubes. The radiating capacity of said space may be increased, as by making the same a secondary minature radiator, preferably of the cross-tube type.

I may obstruct and vent all of the tubes in the radiator on the general principle that, if any of the tubes are deficient in condensing capacity as compared with other tubes, the obstruction and vent therein will prevent the outflow of sufficient steam to exceed the condensing capacity of the upper chamber or to cause air trapping down-flow in any or many of the other tubes.

The above and other features of my invention will be more fully understood from the following description in connection with the drawings, in which, Fig. 1 is a front elevation partly in vertical section showing one form of my invention as embodied in a radiator of the vertical tube type.

It will be understood that the radiators as shown in these drawings are of the air cooled type, and adapted for use in combination with the motor, water supply system, pump and fan commonly employed on automotive vehicles. They may be, and preferably are, units adapted to be substituted for the radiator 4, in the combination of parts shown in Fig. 1 of my abovementioned patent; but they may be employed with or without modifications, wherever an equal-flow up-flow, or air scavenging condenser is desired.

Figure 1:
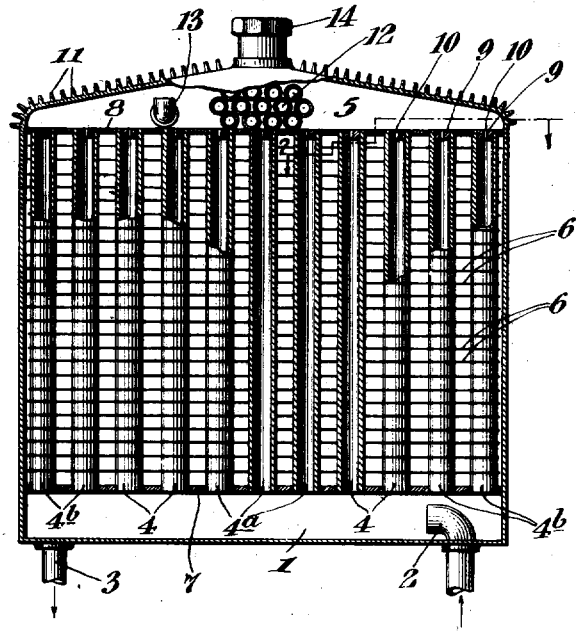

In Fig. 1 of the present drawings, the radiator, here used as a condenser, comprises the separating chamber 1 into which the steam or hot water and steam from the engine is discharged through pipe 2. The water, including condensate, flows out of said space through pipe 3, preferably drawn by a pump which is preferably a force pump and may be a gear pump, as shown in my said patent.

From the separating chamber extend parallel-related tubes, as 4, $4^a$, $4^b$, and $4^b$, communicating at their upper ends with the space 5 at the top of the radiator. Assuming that the structure shown is of the full size commonly employed on trucks, the tubes 4 may be, say 24 inches high and in diameter, ½ inch to ⅝ inch, or of much smaller diameter, as on some automobiles. In practice, there may be many more of them than are shown in the drawings.

Said parallel tubes are secured in thin transverse plates 6, 6, the primary function of which is to conduct and radiate heat from the walls of the tubes, although they also afford some protection and lateral support, tending to hold the tubes in properly spaced relation. The ends of the tubes are soldered, steam-tight, in perforated bottom plate 7 and top plate 8. There may be an overflow pipe 13 through which air may "breathe" in and out. There is usually also the filler cap 14, through which air inevitably enters, when fresh water is supplied to replace losses.

Figure 2:
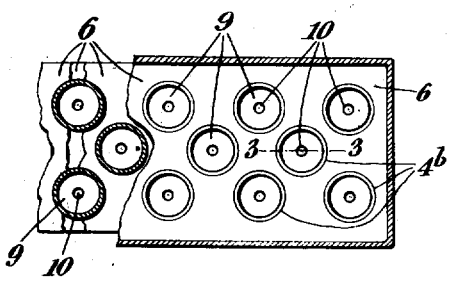
Fig. 2 is a plan view of a horizontal section on the broken line 2—2, Fig. 1.
Figure 3:
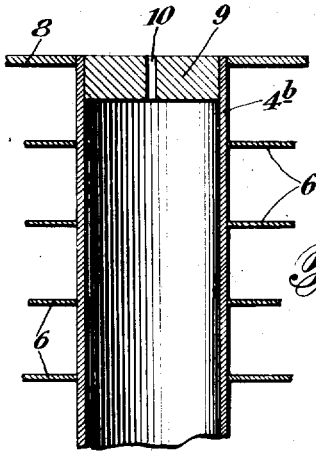
Fig. 3 is an enlarged detail in vertical section on the line 3—3, Fig. 2.

As previously explained, the tubes at the sides are not so well supplied with air draft by the fan and hence are not so well cooled as are the central tubes. The normal result of this would be for the steam to exceed the condensing capacity of the side tubes, and rise into space 5; while a similar volume of steam flowing into the central tubes would be fully condensed in the lower part thereof. The obstructions for preventing this are shown in Figs. 1, 2, and 3, as afforded by a plug 9 in the upper end of each tube, each plug being provided with a vent 10 of suitable length and diameter. All of the tubes are shown as similarly plugged and vented on the general principle that the vents afford no serious obstruction to slow "breathing," yet will throttle excessive outrush of steam from any tube that may be or become deficient in radiating capacity as compared with other tubes, but I find that equipping the side tubes only is sufficient, and therefore preferable.

While the sizes of the vents may be graduated to correspond with the condensing efficiency of each separate tube, this is not necessary and a few sizes, or a single, properly selected size, may be used with good results.

The tubes being all supplied with steam at the same pressure, the sizes of the vents required for the side tubes will depend primarily upon the flow resistances of the several tubes. Where the tubes are all of the same flow resistance, as in the present case, the vent must be small enough size or great enough length so that, after the air has been gradually expelled from the side tubes, as above described, and live steam begins to flow out of their tops, the flow resistance at the vent will be sufficient to pile up a slight back pressure. Such back pressure necessarily takes effect as an upward pressure in the central tubes. Such upward pressure from the side tubes as $4^b$ must be sufficient for establishing and maintaining the large volume of flow of steam which the central tubes, such as $4^a$, will sustain by reason of its greater condensing capacity per unit area of cooling surface, and, in addition, the excess pressure necessary to lift the heavy cool air in the upper parts of a central tube $4^a$. This air, as we have seen, is a fluid which is naturally some 60% heavier than the steam which fills the side tube $4^b$, and, in the present case, said air has 20% or so additional weight because it is kept nearly at atmospheric temperature by the direct blast of the fan, as against the boiling temperature of the live steam in the side tubes, $4^b$.

The greater the condensing capacity of the top space 5, the greater may be the volume of steam that may be permitted to escape from the side tubes without material impairment to functioning. Hence I preferably provide the casing of the upper space with heat radiating ribs 11, 11, and if desired, with transverse air tubes 12, 12. A group of these cross tubes 12 is shown as centrally located and will be recognized as constituting a miniature condenser of the cross-tube, or "honeycomb," type.

I find that locating the restrictions at the tops of the side tubes, has advantages over locating them at any other point in the tube, and also over making the side tubes of uniform smaller flow-section throughout their length. One advantage is that the downflow of condensate is less retarded by the up-flowing steam.

Figure 4:
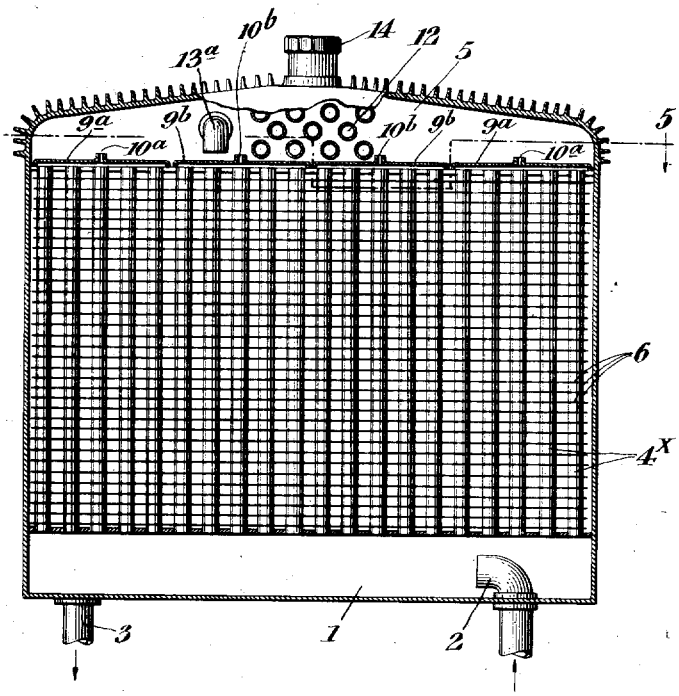
Fig. 4 is a vertical sectional elevation showing a modification.
Figure 5:
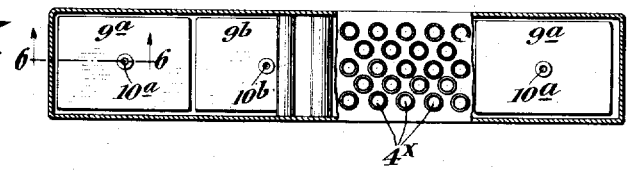
Fig. 5 is a top plan view in horizontal section on the broken line 5—5, Fig. 4.
Figure 6:
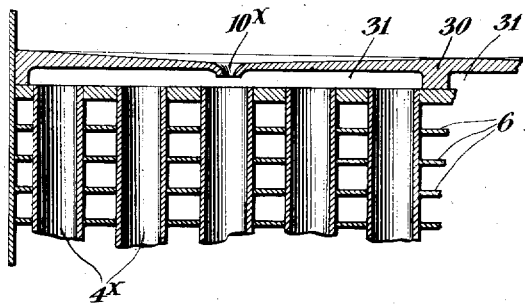
Fig. 6 is a vertical sectional detail of a modification taken on a line corresponding to line 6—6, Fig. 5.

The modifications shown in Figs. 4, 5, and 6 will be readily understood from the above full description of the forms shown in Figs. 1, 2, and 3. In the modifications, a single closure and vent for each group of adjacent tubes, instead of for each tube, is provided. This arrangement is particularly adapted for radiators in which the vertical tubes are greatly multiplied in number and correspondingly reduced in diameter. In such radiators very thin-walled, copper tubes, having a diameter of ¼ inch or less, are commonly employed. While such tubes could conveniently be supplied with individual constrictions at their tops, it is evident that a single closure and vent for a group of tubes will be less expensive to manufacture and the vent may be proportionally larger so that it is less liable to become choked with scale, sediment or dirt. The vent needs to be small only in relation to the combined cross-sectional areas of all of the tubes of the group and need only be small enough to limit free flow of steam from the tops of the less cooled groups and to establish the slight back pressure which will force into the central tubes, the relatively large volume of steam necessary to utilize their superior condensing capacities; and to do so with force sufficient to lift and expel the heavy cool air in the central and upper portions of said central tubes.

In Fig. 4, the vertical tubes are comprised in four groups of which the side groups are controlled by caps $9^a$, $9^a$, having vents $10^a$, $10^a$; and the central groups by caps $9^b$, $9^b$ having vents $10^b$, $10^b$. As before stated, there may be a greater or less number of individual groups and caps and. if desired, only the side groups need be capped. the central groups remaining unobstructed.

Another feature shown in Fig. 4 is having the over-flow pipe $13^a$ arranged with its intake located near the bottom of upper space 5. This arrangement is of advantage because when steam escapes from the tops of the side tubes in any substantial volume, and there begins to be a slight pressure to cause out-flow through $13^a$, the fluid that flows out will be the downwardly displaced heavy air rather than the steam which naturally seeks the top of said space 5.

It will be noted that the vents $10^b$ do not lead from the lowest point in space 5; hence space 5 will not be completely drained of condensate. This may be of no great importance in some climates and under certain conditions, but where complete drainage of condensate is desired, the vents may be arranged after the manner shown in Fig. 6. Here the groups are closed in by plate 30, having separate cavities 31, 31, for each group of tubes. The upper surface of the plate is formed as shown so that all condensate will drain by gravity toward the downwardly directed vent $10^x$.

In the foregoing I have referred to the tubes which are less cooled and which require restriction of their flow capacity as being the "side tubes," and those which are better cooled and more likely to trap air as being the "central tubes." It will be evident, however, that in attempting to apply my invention to radiators other than those illustreated herein, it will always be a question of fact which tubes have excessive flow capacity or deficient cooling.

For instance, a vertical tube radiator may have so many banks of tubes from front to rear and these tubes may be so thin walled and closely set that rear tubes may be insufficiently cooled as compared with the front tubes. In such case the rear tubes have their flow capacity restricted.

Figure 7:
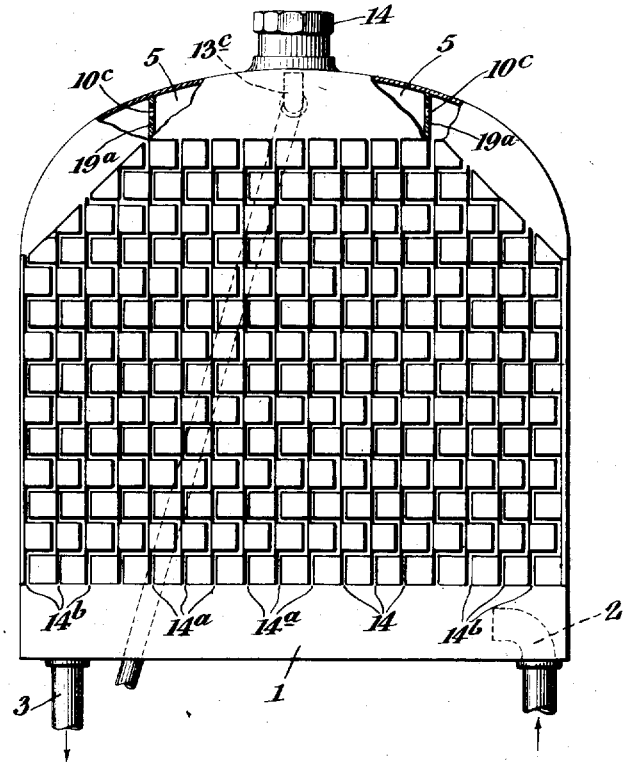
Fig. 7 is an elevation partly in section, and Fig. 8 a detailed vertical section showing another modification.
Figure 8:
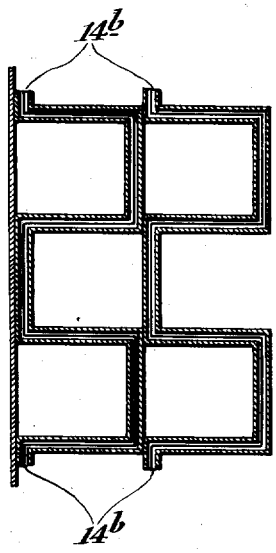

Figs. 7 and 8 indicate a simple arrangement wherein two vented partitions are employed on the so-called "cellular" type of radiator. In this type, the up-and-down passages afford separate parallel paths for flow of steam and condensate, but each flow path follows vertical and horizontal directions alternately, as by following three sides of successive rectangles. These zig-zag passages are commonly formed by two sheets of thin brass or copper of the desired length, folded together and soldered at the edges to form flat tubular strips, having a cross section, say three to three and one-half inches from front to rear of the radiator, but in thickness only one-sixteenth inch to one-thirty-second inch, or less. The present arrangement will be recognized as another solution of the problem presented in my application, Serial Number 500,382, filed September 13, 1921, patented May 15, 1923, No. 1,455,737.

In my present arrangement, the honeycomb construction is uniform throughout, but the corners of the honeycomb are sliced off so that, while the central flow passages $14^a$ are all of the same length and height, the passages $14^b$ are progressively shorter toward the respective sides. Such radiators are standard equipment on Crane-Simplex automobiles. This radiator, in original form, when connected for operation in accordance with my "steam cooling" method, gave marked indications of the above-described premature rush of steam through the shorter side passages and a cold spot due to trapping of air at the upper central portions of the honeycomb.

This radiator was then equipped with two partitions $19^a$, $19^a$, one on each side, shutting off the outlets of the side tubes which are shorter and farther removed from the cooling draft produced by the fan. In each partition is a vent $10^c$. This arrangement works well when the diameter of the vents is, say one-eighth of an inch to one-sixteenth of an inch, or even less. When the diameter is one-eighth of an inch and the engine is working at full load, there seems to be enough steam from the vents to heat up the space in the top of the reservoir, but the steam coming through the vents is insufficient to trap air in the central portion. The central portion heats up clear to the top and all over before any steam blows off. While advantage may be derived from partitions with one-eighth of an inch, or even more diameter of vent, it is evident that a vent less than one-eighth of an inch in diameter is preferable.

The above-described two-partition arrangement will improve the functioning in radiators of the small-diameter, straight-tube type where the tubes are all of the same length as described in connection with Fig. 4, and will prove even more useful where the side tubes are shorter than the central tubes and are therefore of relatively low-resistance and correspondingly great flow capacity.

In the last described arrangement wherein the "empty space" in the top of the radiator is provided with vented partitions, as well as in all other herein described forms of the invention, the vented restrictions have been referred to as being interposed between the vertical tubes and said "empty space." As to this, it is important to note that said "empty space" is an equal-pressure cross connection between the vents of the tubes and the atmosphere. It follows that in certain cases the open air may be substituted for said "empty space" and that, if the vents are properly proportioned, they may have their pressure cross-communication through the open air. Either with or without said empty space, the vents leading to the open air may be controlled by valves if desired. For instance, out-breathing check valves may be arranged for every vent; or in-breathing valves for some vents and out-breathing valves for others. Preferably, such valves will be very light, particularly the out-breathing valves may be small ball check valves with the ball made of bakelite.

It will be recognized that my present inventions concern ways of diverting or shifting the flow of steam to a desired extent from the radiator passages of less cooling capacity to those of greater cooling capacity. As concerns the broad invention the arrangements herein shown are closely related to those of my applications, Serial Numbers 500,381 and 500,382, filed September 13, 1921, and Serial Number 520,209, filed December 6, 1921, patented May 15, 1923, Nos. 1,455,736, 1,455,737, and 1,455,738. The present case is selected for presentation of the generic claims, the intention being to present in the other applications claims which cannot be made in this application.

I claim:

1. A radiator embodying separate interior passages for up-flow of steam or vapor to be condensed; means including a cross communication between the lower portion of said passages for up-flow supply of steam or vapor to said passages, some of the flow paths normally having greater cooling capacity than others; portions of the flow section which have less condensing capacity being arranged to have less flow capacity than those having greater condensing capacity.

2. A radiator comprising a lower chamber and an upper chamber and separate intermediate passages cross-communicating through said lower and upper chambers; means for supplying steam in said lower chamber and withdrawing condensate therefrom and means whereby air may breathe in and out of said upper chamber to relieve excessive internal pressure and vacuum conditions attendant upon use of the device, the passages of less condensing capacity having greater flow resistance than those of greater condensing capacity.

3. A radiator comprising a lower chamber and an upper chamber and a multiplicity of separate intermediate passages cross-communicating only through said lower and upper chambers; means for supplying steam in said lower chamber and withdrawing condensate therefrom and means for permitting air to breathe in and out of said upper chamber in response to the internal pressure changes attendant upon use of the device, certain of said passages being of similar flow section but less length than others in combination with means for obstructing out-flow of steam from said shorter passages.

4. A radiator of the type comprising a lower chamber and an upper chamber and a multiplicity of separate intermediate passages cross-communicating only through said lower and upper chambers; means for supplying steam in said lower space and withdrawing condensate therefrom and means for permitting air to breathe in and out of said upper space in response to the internal pressure changes attendant upon use of the device, certain of said passages being of similar flow section but of less length than others in combination with vented outlets for said shorter pasages to permit slow in and out breathing of air while throttling outrush of steam from said shorter passages when their radiating capacity is overtaxed.

5. A variable-duty, air-cooled radiator of the type comprising a lower space connected by a multiplicity of upwardly extending tubes with an upper space; means for discharging boiling liquid or steam into said lower space and for withdrawing condensate therefrom; and a desired number of restrictions controlling outlet of steam from the upper ends of a desired number of said tubes.

6. A variable-duty, air-cooled radiator of the type comprising a lower chamber connected by many upwardly extending tubes with an upper space for escape of air; means for discharging boiling liquid or steam into said lower space and for withdrawing condensate therefrom; and a desired number of vented outlets each controlling outlet of steam from the upper end of a different group of tubes.

7. A variable-duty, air-cooled radiator of the type comprising a lower cross-connection communicating with many upwardly extending tubes; means for discharging boiling liquid or steam into said lower cross-connection and for withdrawing condensate therefrom; and a desired number of vented outlets, each controlling outlet of steam or vapor from the upper end of a different group of tubes, the tubes being grouped for similarity of condensing capacities.

8. A variable-duty, air-cooled radiator of the type comprising a lower space connected by a multiplicity of upwardly extending tubes with an upper space accessible to air; means for discharging boiling liquid or steam into said lower space and for withdrawing condensate therefrom; and one or more vented outlets, each controlling outlet of steam or vapor from the upper ends of a group of tubes having lesser condensing capacity.

9. A radiator in which the interior paths for flow of steam or vapor to be cooled are laterally distributed and some of the flow paths normally have greater cooling capacity than others, and are arranged to permit escape of air through the upper portions thereof, in combination with connections for operating said radiator as an up-flow condenser; portions of the flow section having less condensing capacity being arranged to have less flow than those having greater condensing capacity.

10. A variable-duty, air-cooled radiator in which the interior paths for flow of fluid to be cooled are laterally distributed and some of the flow paths normally have greater cooling capacity than others and are arranged to permit escape of air through the upper portions thereof, in combination with means for up-flow supply of steam or vapor to interior paths of different cooling capacities simultaneously and at approximately equal pressures; selected portions of the flow section of lesser condensing capacities being arranged to have correspondingly greater flow resistance whereby other portions having greater condensing capacities are adequately supplied with steam or vapor before said first-mentioned portions are overtaxed enough to permit excessive through-flow of the steam or vapor.

11. An air-cooled radiator in which the interior paths for flow of fluid to be cooled are laterally distributed and some of the flow paths have less cooling capacity per unit length than others; and means for supplying said fluid thereto from a common source simultaneously and at approximately the same pressures; portions of the flow section having less cooling capacity being arranged to have correspondingly greater flow resistance than those having greater cooling capacity; for the purpose and with the result that the fluid automatically distributes its flow according to the several cooling capacities.

12. A variable-duty radiator having many interior paths of different cooling capacities or rates; means for up-flow supply of steam or vapor to many of said interior paths simultaneously at approximately equal pressures, whereby air within the radiator is automatically forced by the flow of the steam or vapor to a region determined by the volume of said flow, by the several flow capacities and condensing capacities of the several passages, and by the superior weight of the air; in combination with flow restricting means for limiting the free flow of steam from the less actively cooled passages into said region.

13. A variable-duty, air-cooled radiator of a type having many interior paths of different cooling capacities or rates; means for up-flow supply of steam or vapor to many of said interior paths, simultaneously, whereby, as the volume of steam increases, air within the radiator is automatically forced by the flow of the steam or vapor to a region determined by the volume of said flow, by the several flow capacities and condensing capacities of the several passages, and by the superior weight of the air; in combination with an outlet from said region permitting in- and out-breathing of air, and flow restricting means for limiting the free flow of steam from the less actively cooled passages into said region.

14. A variable-duty radiator of the motor vehicle type which is of relatively large front area and thin from front to rear and adapted to be cooled by an induced draft effective unequally on different portions of the front area; said radiator comprising a lower chamber and an upper chamber connected by many upwardly extending tubes of similar material, cross-section and thickness of walls, cross-communicating only through said lower and upper chambers; means for supplying boiling liquid, steam or vapor to all of said tubes simultaneously and at approximately the same pressures through said lower chamber and for withdrawing condensate therefrom; and flow restricting means for imposing predetermined restriction on flow of steam or vapor from the upper ends of certain of the tubes which are less effectively cooled than others for the purpose described.

15. In the combination specified by claim 14, the further feature that the less well-cooled tubes are shorter than other tubes and the vents therefor are correspondingly restricted to prevent up-rush of steam or vapor in excess of the radiating capacity of the upper chamber.

16. An air-cooled condensing apparatus affording interior, laterally distributed, parallel paths for flow of fluid to be cooled, some of which parallel paths have less cooling capacity than others; and means for supplying said fluid to the parallel paths from a common source; certain of the parallel flow paths of less cooling capacity being arranged to have substantially greater total flow resistance than those having greater cooling capacity; for the purpose and with the result that the fluid automatically flows in greater quantity to the flow paths having greater cooling capacity.

17. An air cooled radiator having low resistance flow paths for the cooling fluid over the central portions of the area of the honey comb and higher flow resistance for the paths at the side portions of said area.

18. An air cooled condensing radiator of a type having a plurality of separate condensing passages, permitting through flow of fluid, and a common source freely supplying steaming fluid to all of said passages and in which in operation some of said passages may have their condensing capacity overtaxed before other of said passages are operating at maximum condensing capacity, in combination with outlet restricting elements for said passages, said outlet restricting elements opposing relatively great flow resistance to quantity outflow of fluid from said passages, for the purpose and with the result that back pressure is created in said overtaxed passages whereby said steaming fluid is caused to flow in increased quantity into such of said passages as are not operating at maximum condensing capacity.

19. An air cooled condensing apparatus having interior, parallel paths for flow of fluid, some of which parallel paths have less cooling capacity than others, means for supplying steaming fluid to said parallel paths from a common source; a chamber into which all of said paths have outlet, and in which apparatus, in operation, the paths of less cooling capacity may become overtaxed and permit through flow of steam before the apparatus as a whole is operating at full condensing capacity, in combination with flow restricting elements for said passages opposing relatively great flow resistance to through flow of fluid for the purpose and with the result that excessive outrush of steaming fluid for said passages is prevented and back pressure set up in those paths having least cooling capacity so that the flow of fluid is automatically distributed according to the cooling capacity of the several passages.

20. An air-cooled radiator in which the interior paths for flow of fluid to be cooled are laterally distributed and some of the flow paths have less cooling capacity per unit length than others; and means for supplying said fluid at the inlet ends of all said paths, from a common source, simultaneously and at approximately the same pressures; and a chamber at the outlet ends of said paths into which fluids may flow; and outlet restricting elements designed to afford no serious obstacle to slow outflow of fluid but operating to restrain excessive outrush of steam, whereby when in full operation, portions of the flow section having less cooling capacity have correspondingly greater flow resistance than those having greater cooling capacity; for the purpose and with the result that the flow of steam is automatically distributed according to the several cooling capacities.

21. A variable-duty radiator of the motor vehicle type which is of relatively large front area and thin from front to rear and adapted to be cooled by an induced draft effective unequally at different portions of the front area, said radiator including two chambers connected through a plurality of tubes or passages having spaces therebetween for the flow of air from front to rear, said tubes cross-communicating through said chambers, means for supplying boiling liquid, steam or vapor through one of said chambers to all of said tubes simultaneously and at approximately the same pressures, and flow restricting means for imposing predetermined restriction on the flow through the tubes to prevent excessive rush of air, steam or vapor from said supply chamber through tubes that are less effectively cooled, to the other chamber and into the outlet ends of the more effectively cooled tubes to trap air in the latter.

22. A variable-duty radiator of the motor vehicle type which is of relatively large front area and thin from front to rear and adapted to be cooled by an induced draft effective unequally at different portions of the front area, said radiator including two chambers connected through a plurality of tubes or passages having spaces therebetween for the flow of cooling air from front to rear, said tubes cross-communicating only through said chambers, means for supplying boiling liquid, steam or vapor to all of said tubes simultaneously and at approximately the same pressures through one of said chambers, and flow restricting means for preventing steam from passing freely through certain of said tubes into the other chamber and from the latter into other tubes.

23. A variable-duty radiator of the motor vehicle type which is of relatively large front area and thin from front to rear and adapted to be cooled by an induced draft effective unequally at different portions of the front area, said radiator having a pair of chambers connected by a plurality of tubes having spaces therebetween for the flow of air from front to rear, said tubes cross-communicating only through said chambers, means for supplying boiling liquid, steam or vapor to all of said tubes simultaneously and at approximately the same pressures through one of said chambers, and flow retarding means for preventing steam from the less actively cooled passages from entering the outlet ends of the more actively cooled passages and trapping air in the latter.

24. A radiator of the motor vehicle type which is of relatively large front area and thin from front to rear and adapted to be cooled by an induced draft of air from the front to the rear, said radiator including a pair of chambers connected by a plurality of substantially parallel tubes, means for supplying boiling liquid, steam or vapor, to all of said tubes simultaneously, and at approximately the same pressures through one of said chambers, a partition subdividing the other chamber into compartments having restricted communication with each other, and an air outlet communicating with one of said compartments.

25. A radiator of the motor vehicle type which is of relatively large front area and thin from front to rear and adapted to be cooled by an induced draft of air from the front to the rear, said radiator including chambers connected by a plurality of substantially parallel tubes, means for supplying boiling liquid, steam or vapor, to all of said tubes simultaneously, through one of said chambers, and means in the other chamber for separating said tubes into groups having restricted communication with each other through said last mentioned chamber.

26. A radiator of the motor vehicle type which is of relatively large front area and thin from front to rear and adapted to be cooled by an induced draft of air from the front to the rear, said radiator comprising a pair of chambers connected by a plurality of parallel-flow tubes, means for supplying boiling liquid, steam or vapor, to all of said tubes simultaneously, and at approximately the same pressures, through one of said chambers, and vent means for certain of said tubes the size of the vent being such that the volume of steam escaping from the tubes will be kept well below the condensing capacity of said second mentioned chamber.

27. A variable-duty, air-cooled radiator of the motor vehicle type, including a fluid receiving and distributing chamber connected by many separate condensing tubes or passages with an outlet space for escape of air; means for discharging boiling liquid or steam into said chamber; outlet means to permit condensate to leave the radiator; and a desired number of vent outlets, each controlling outlet of steam or vapor from the outlet end of a different group of tubes, said groups of tubes having different condensing capacities.

Signed at New York city, in the county of New York and State of New York, this 13th day of May, A. D., 1925.

SAMUEL W. RUSHMORE.